Dec. 30, 1969　　　L. SCHWARTZ　　　3,486,175
ADJUSTABLE LAVATORY
Filed Aug. 17, 1966　　　　　　　　　　　　7 Sheets-Sheet 1
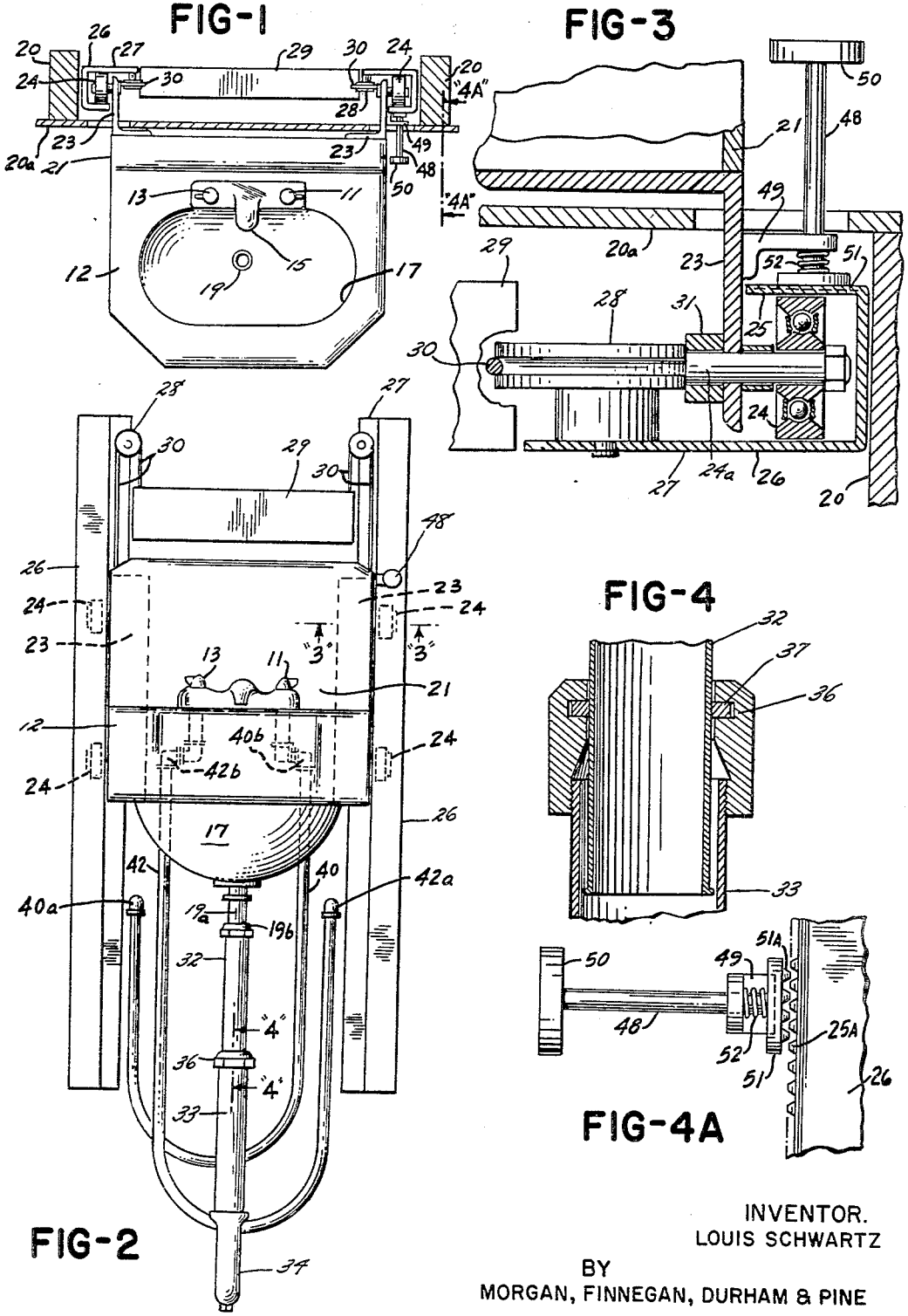
INVENTOR.
LOUIS SCHWARTZ
BY
MORGAN, FINNEGAN, DURHAM & PINE
ATTORNEYS Dec. 30, 1969  L. SCHWARTZ  3,486,175
ADJUSTABLE LAVATORY
Filed Aug. 17, 1966  7 Sheets-Sheet 2

INVENTOR.
LOUIS SCHWARTZ
BY
MORGAN, FINNEGAN, DURHAM & PINE
ATTORNEYS

Dec. 30, 1969  L. SCHWARTZ  3,486,175
ADJUSTABLE LAVATORY
Filed Aug. 17, 1966  7 Sheets-Sheet 3

INVENTOR.
LOUIS SCHWARTZ
BY
MORGAN, FINNEGAN, DURHAM & PINE
ATTORNEYS

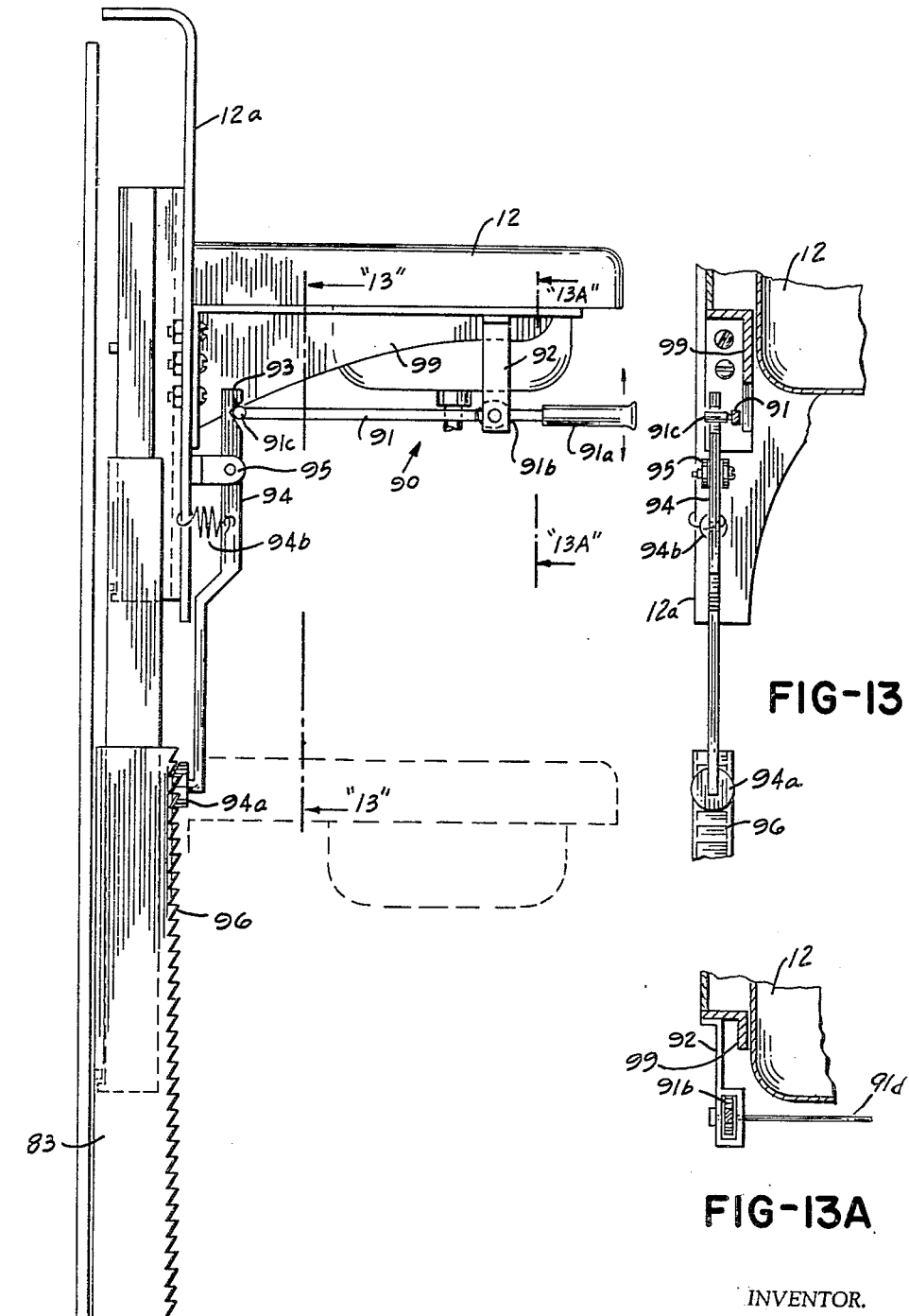

Dec. 30, 1969    L. SCHWARTZ    3,486,175
ADJUSTABLE LAVATORY
Filed Aug. 17, 1966    7 Sheets-Sheet 5
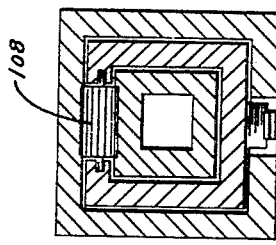
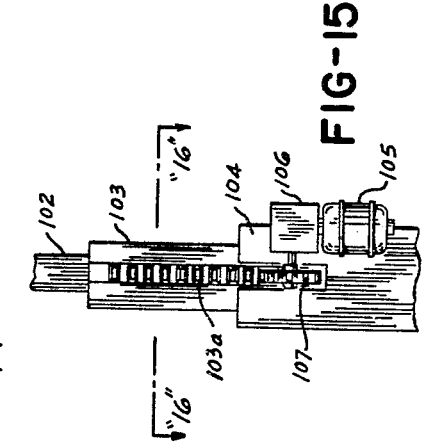
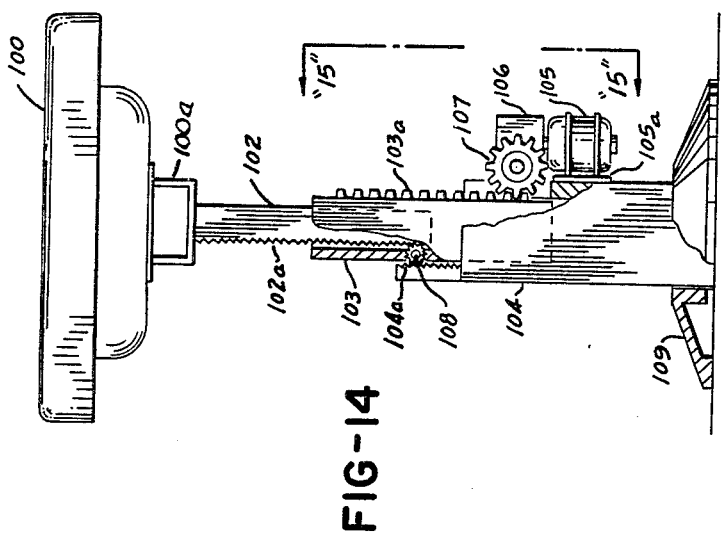
INVENTOR.
LOUIS SCHWARTZ
BY
MORGAN, FINNEGAN, DURHAM & PINE
ATTORNEYS Dec. 30, 1969     L. SCHWARTZ     3,486,175
ADJUSTABLE LAVATORY
Filed Aug. 17, 1966     7 Sheets-Sheet 6
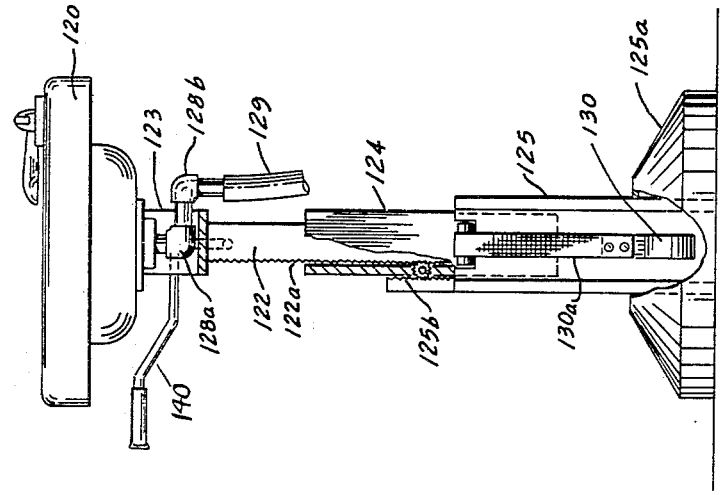
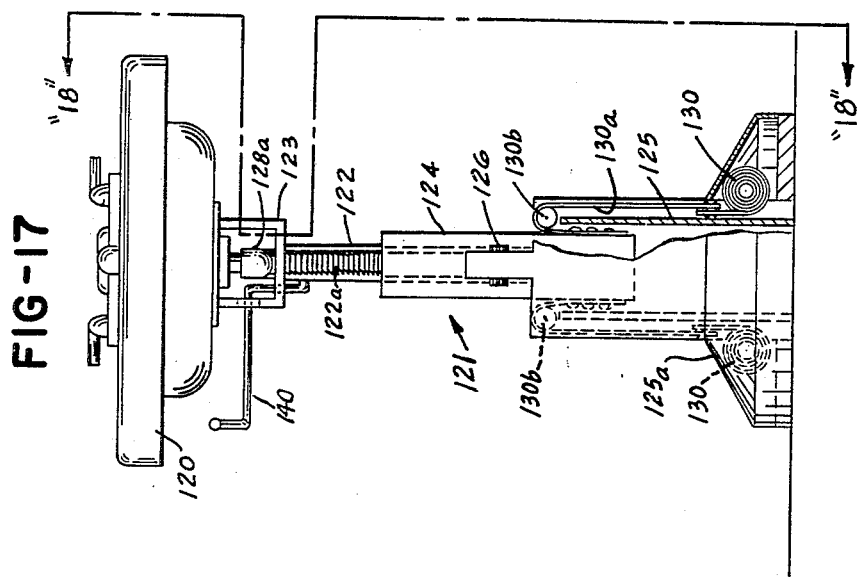
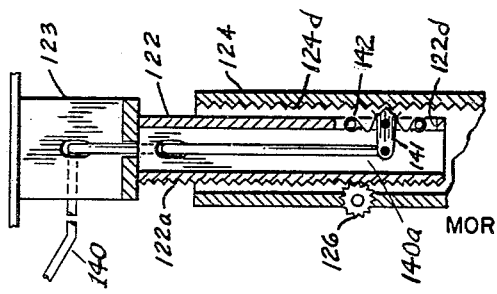
INVENTOR.
LOUIS SCHWARTZ
BY
MORGAN, FINNEGAN, DURHAM & PINE
ATTORNEYS Dec. 30, 1969  L. SCHWARTZ  3,486,175
ADJUSTABLE LAVATORY
Filed Aug. 17, 1966  7 Sheets-Sheet 7
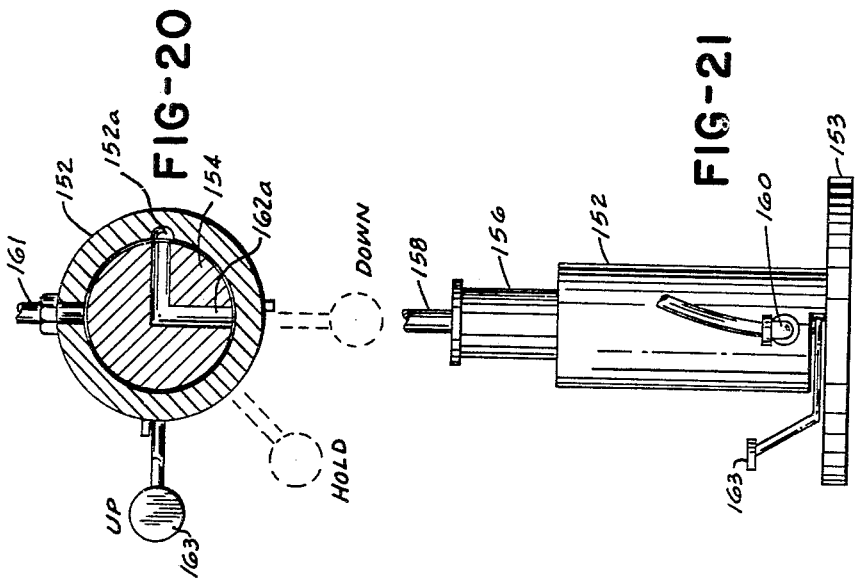
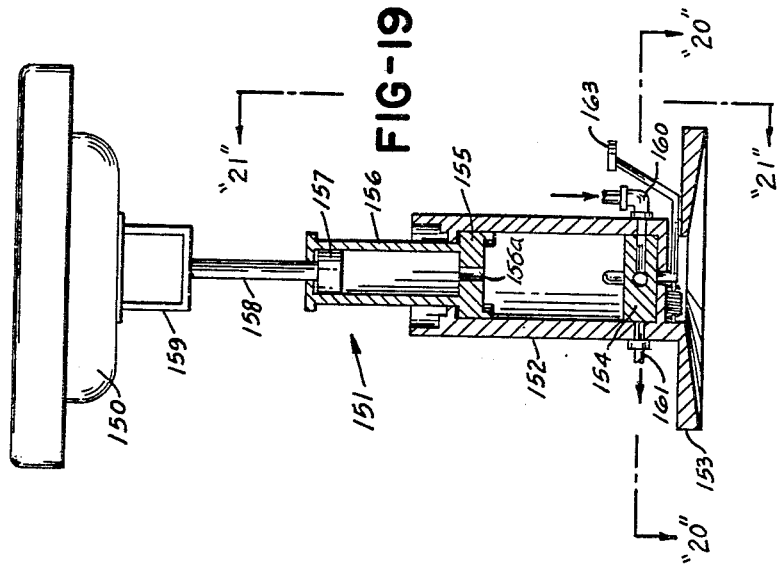
INVENTOR.
LOUIS SCHWARTZ
BY
MORGAN, FINNEGAN, DURHAM & PINE
ATTORNEYS United States Patent Office 3,486,175
Patented Dec. 30, 1969

3,486,175
ADJUSTABLE LAVATORY
Louis Schwartz, 107 W. 86th St., Apt. 6–C,
New York, N.Y. 10024
Filed Aug. 17, 1966, Ser. No. 573,042
Int. Cl. A47k 1/04, 1/32
U.S. Cl. 4—170
37 Claims

ABSTRACT OF THE DISCLOSURE

Disclosed herein are vertically adjustable lavatory structures employing control mechanisms for changing the elevation of the lavatory; the illustrated mechanisms variously take the form of hydraulic, electrical and spring-assisted controllers, telescoping supports and compound displacement structures together with associated braking linkages.

This invention relates to lavatories and more particularly to lavatories having adjustable orientations.

The substantial height range in the human form, ranging from less than three feet for children to over six feet for a respectable number of adults, makes the conventional fixed wash basin necessarily inconvenient for a great number of users. Disabled and elderly individuals are inconvenienced to an even greater extent.

While proposals have been made for vertically adjustable lavatories, they have been burdened by material defects and disadvantages involving insufficient or uncontrolled adjustability, lack of stability, excessive complexity and cost, difficulty in operation, poor reliability, lack of adaptability to varying basin styles and installation configurations, and objectionable aesthetics. Significant commercialization of such proposals has not been realized.

It is accordingly an object of the invention to provide aforementioned objections and which are easily controlled over a wide range, are stable, are of pleasing configuration, are adapted to many installation requirements and lavatory styles, and, at the same time, are simple and inexpensive in design.

Other objects and advantages of the invention will be set forth in part hereinafter and in part will be obvious herefrom, or may be learned by practice with the invention, the same being realized and attained by means of the instrumentalities and techniques pointed out in the appended claims.

The invention consists in the novel parts, arrangements, combinations, improvements and instrumentalities herein shown and described.

Serving to illustrate exemplary embodiments of the invention are the drawings of which:

FIGURE 1 is a plan view of a first embodiment of the invention;

FIGURE 2 is a front elevational view of the embodiment of FIGURE 1;

FIGURE 3 is an enlarged fragmentary sectional view taken along the lines 3—3 of FIGURE 2;

FIGURE 4 is an enlarged fragmentary sectional view taken along the lines 4—4 of FIGURE 2;

FIGURE 4A is a detail view of the locking arrangement employed in the system of FIGURE 1;

FIGURE 12 is a side elevational view of the embodiment of FIGURES 9 and 10 showing additional motion control details;

FIGURE 13 is a detail fragmentary view, partly in section, taken along the lines 13—13 of FIGURE 12;

FIGURE 13A is a detail fragmentary view, partly in section, taken along the lines 13A—13A of FIGURE 12;

FIGURE 14 is an elevational view, partly in section, of a fifth embodiment of the invention;

FIGURE 15 is a fragmentary elevational view taken along the lines 15—15 of FIGURE 14;

FIGURE 16 is a cross sectional view taken along the lines 16—16 of FIGURE 15;

FIGURE 17 is a front elevational view, partly broken away, of a sixth embodiment of the invention;

FIGURE 18 is a side elevational view, partly in section, taken along the lines 18—18 of FIGURE 17;

FIGURE 18A is an enlarged detail view in section, showing the motion control means employed in tthe embodiment of FIGURES 17 and 18;

FIGURE 19 is an elevational view, partly in section, of a seventh embodiment of the invention;

FIGURE 20 is a cross sectional view taken along the lines 20—20 of FIGURE 19; and FIGURE 21 is an elevational fragmentary view taken along the lines 21—21 of FIGURE 19.

Figure 5:
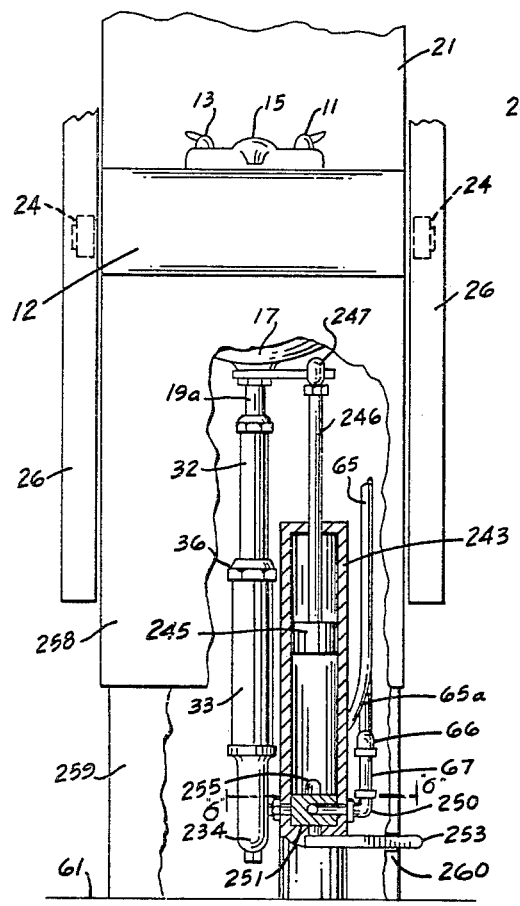
FIGURE 5 is a front elevational view, partly broken away, corresponding generally to FIGURE 2, but showing a second embodiment of the invention.

In the first embodiment of the invention illustrated in FIGURES 1 through 4A, a wash basin 12 is provided having cold and hot water taps 11 and 13, respectively, for controlling the water mixture discharged from a nozzle 15 into basin cavity 17. The latter includes a drain 19 which is connected to the usual waste line by way of a telescoping assembly which includes telescoping pipe 19a, coupling 19b, telescoping pipe 32, coupling 36, pipe 33 and trap 34.

One section of the telescoping drain assembly is shown in greater detail in FIGURE 4, both sections being similar except for appropriate dimensional differences. The section as illustrated in FIGURE 4 includes a sealing ring 37 surrounding pipe 32 and constrained in an annular groove in the upper section of threaded collar 36. The latter is threaded on lower pipe 33.

This arrangement provides a liquid type telescoping drain assembly which accommodates the raising and lowering of the basin as hereinafter described.

Cold water tap 11 and hot water tap 13 are connected by respective flexible lines 40 and 42 to the water supply lines provided as a part of the conventional plumbing. The connections are made by way of couplings 40a and 42a as shown in FIGURE 2. The upper ends of the lines 40 and 42 connect to the respective taps 11 and 13 by appropriate couplings 40b and 42b illustrated in FIGURE 2. The flexibility of the lines 40 and 42 also serve to accommodate the varying heights of the wash basin.

For smoothly controlled vertical displacement of the wash basin 12, there is provided two pairs of rollers 24 (see FIGURES 1, 2 and 3). Each pair of rollers is rotatably mounted on a respective angle bracket 23 which is fixed to a back plate 21 of the basin assembly.

As shown in greater detail in FIGURE 3, each roller assembly 24 is secured to its bracket 23 by a respective nut 31 threaded on the roller axle 24a.

Each pair of rollers rides in a respective track illustratively embodied as a channel member 26 which is adapted for connection to a wall or to the framing as, for example, by bolting each track to the side of a respective stud 20 (see FIGURES 1 and 3). A suitable panel 20a may be fastened to the studs and slotted as shown in FIGURES 1 and 3 to accommodate the movement of the basin and its brackets 23 while at the same time concealing the track assembly and other mechanisms described below.

For balancing basin 12 and to facilitate ease of adjustment, counter-balancing means are provided, illustratively in the form of a counter-weight 29 suspended from cables 30. Each cable 30 is entrained over a respective pulley 28 with one end connected to the counter-weight and the other to the basin assembly as by being clamped or hooked to the respective bracket 23.

Due to the change in weight when varying levels of water are in the basin, complete balance is generally not attainable. Moreover, many users are likely to lean on or press against the basin in varying degrees. Accordingly, clamping means are provided which in the exemplary embodiment take the form of a spring loaded plunger 48 extending outwardly from the rear wall along the side of the basin 12 as shown in FIGURES 1, 2 and 3. The plunger 48 is axially slidable in a bracket 49, FIGURES 1, 3 and 4A, which is fixed to the basin assembly by way of connection to one of the brackets 23. The plunger 48 includes a control knob 50 at one end and an engaging disc 51 at the other. A spring 52 urges disc 51 into engagement with the outer flange 25 of one of the fixed tracks 26.

The mating surfaces of the track flange and engaging disc are preferably irregular in shape, or formed as engaging rack surfaces 51a and 25a as illustrated in FIGURE 4A to provide positive and reliable clamping action. When control knob 50 is pulled out disengagement of the clamping mechanism occurs and the basin assembly is freed for vertical adjustment.

In operation, the user adjusts the basin to the required height by pulling on control knob 50 and gently exerting the necessary upward or downward pressure. The resultant motion is smooth and accomplished with little effort. When the basin is at its desired height, the control knob 50 is released causing the clamp to secure the basin to the fixed framing by way of the engaged track assembly.

Figure 6:
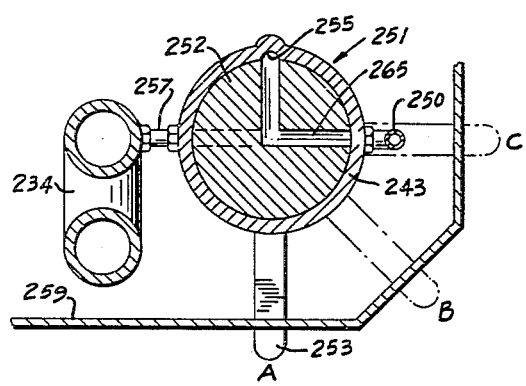
FIGURE 6 is an enlarged fragmentary sectional view taken along the lines 6—6 of FIGURE 5.

The embodiment illustrated in FIGURES 5 and 6 is shown as a general basin assembly similar to that described in connection with the first embodiment. The plumbing for the hot and cold water supply has been omitted for clarity and the roller track assembly only partly shown.

In the second embodiment, displacements of the basin 12 are accomplished by hydraulic means so far as raising the basin is concerned while the weight of the basin is employed when lowering is desired. The hydraulic system is of a character which permits locking the basin once its desired position has been attained.

The hydraulic system includes a hydraulic actuator mounted on the floor 61 and having a cylinder 243, a piston 245, a piston rod 246 and a valve 251. The distal end of the rod 246 is coupled to the drain connection of basin cavity 17 by way of a coupling 247.

Fluid under pressure is derived from a convenient source such as the water line 65. One branch 65a thereof supplies the respective faucet of the basin while a second branch is connected to the hydraulic actuator valve 251 via coupling 66, pipe 67 and coupling 250.

As seen in FIGURE 6, the hydraulic valve 251 includes a valve plate 252 rotatably adjusted by control handle 253. With the handle in position A as illustrated in FIGURE 6, the valve inlet 250 communicates with a bore 255 in cylinder 243 by way of a passageway 265 in the valve plate, whereupon water under pressure enters the cylinder causing piston 245 to rise. Accordingly, the basin commences to be elevated.

When the desired height is attained, control handle 253 is placed in position B thus cutting off the water supply from the interior of cylinder 243. The latter is also sealed in this position thus holding the basin at the adjusted height.

To lower the basin, the control arm 253 is placed in position C thereby connecting the interior of the cylinder 243 to the waste pipe by way of bore 255, passageway 265, and coupling 257, which as shown in FIGURE 6, connects to a section of drain trap 234.

To provide a pleasing appearance, the basin assembly of FIGURES 5 and 6 includes an upper skirt 258 attached to the basin and a lower fixed skirt 259, over which upper skirt 258 telescopes. Skirt 259 is provided with an opening 260 to accommodate the control handle 253.

Figure 7:
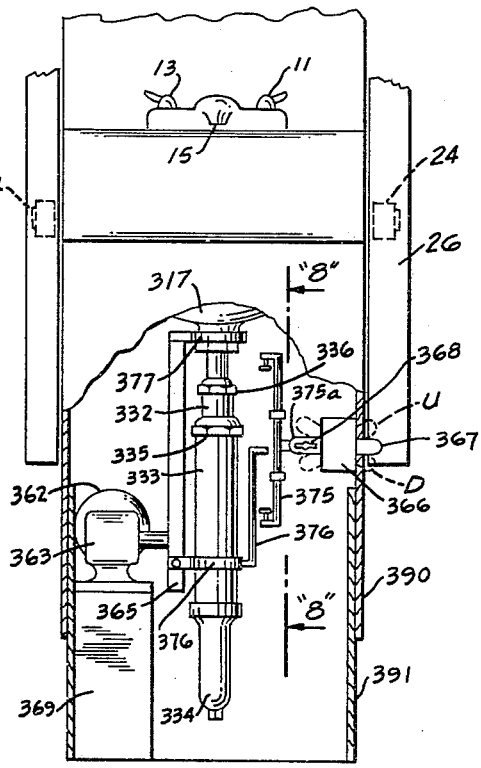
FIGURE 7 is a front elevational view, partly broken away, corresponding generally to FIGURE 2, but showing a third embodiment of the invention.
Figure 8:
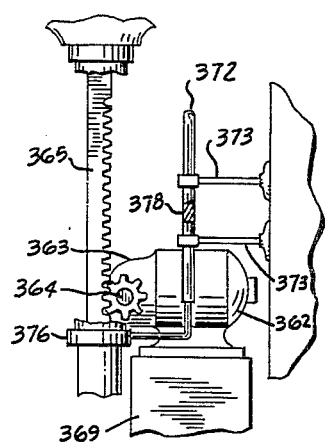
FIGURE 8 is an enlarged fragmentary sectional view taken along the lines 8—8 of FIGURE 7.

The third embodiment, illustrated in FIGURES 7 and 8, is similar to the previously described embodiments so far as the structure of the basin, roller-track, guiding system and water supply lines are concerned. However, it employs electric motor means for raising and lowering the basin. In the illustrated embodiment, a motor 362 is provided which is mounted on a pedestal 369. The output shaft of the motor is connected to the basin assembly via a gear reduction box 363, a pinion 364 connected to the gear reduction output, a mating rack 365 and coupling 377. The latter is secured to the drain assembly of the basin.

A double pole, double throw switch 366 operated by a control member 367 energizes the motor from the local supply means with a polarity or phasing condition established according to whether the basin is to be raised or lowered. Thus, by placing the switch in position D as shown in FIGURE 7, the motor is energized and operates in a direction which causes a lowering of the basin through drive system 363, 364, 365. The position U causes the basin to rise.

To limit the motor action, a limit switch assembly is included. This assembly employs a limit control arm 376 which is coupled to the rack 365 by way of a coupling 376 slideably disposed on drain pipe section 333. Limit control arm 376 is configured and oriented to engage switch return means embodied as a linkage 375 which is coupled to switch 366 by way of a link 375a. The switch limit mechanism 375 is displaced vertically via the linkage 375a by actuation of the switch control lever 367. Thus, when lever 367 is placed in the D position, the switch limit linkage 375 is elevated. As noted above, the motor under these conditions commences to lower the basin. As this occurs, the limit control arm 376 is gradually lowered until it contacts the lower extremity of the switch limit linkage 375 at which time it returns the switch control 367 to its off or central position thus deactivating the motor at the lower limit of downward motion. When control lever 367 is placed in the U position, a similar action occurs except that limit control arm 376 engages the upper extremity of linkage 375 thus returning the switch control lever 367 to its off position at the upper limit of travel.

In the majority of cases, the limits of travel will not be reached and the user will restore switch control 367 to its center or off position when the desired basin elevation is attained.

As in the embodiment of FIGURES 5 and 6, a telescoping skirt assembly comprising upper section 390 coupled to the basin and lower section 391 secured to the floor or framing is provided to conceal the actuating mechanisms.

Figure 9:
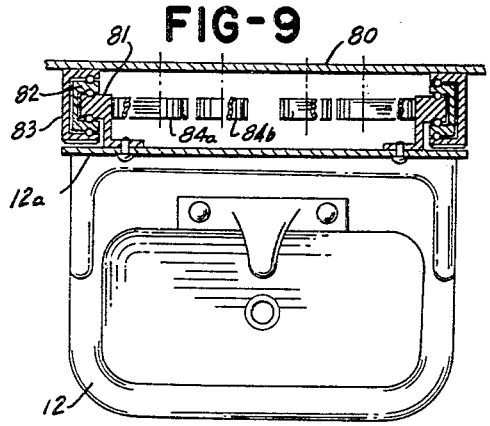
FIGURE 9 is a plan view, partly in section, of a fourth embodiment of the invention.
Figure 11:
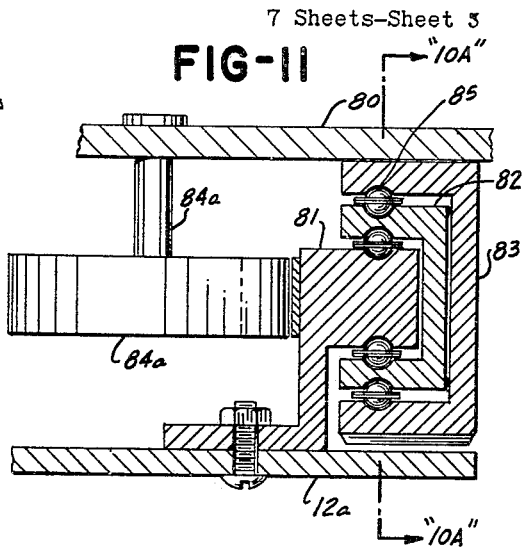
FIGURE 11 is a detail view, in section, taken along the lines 11—11 of FIGURE 10.
Figure 10:
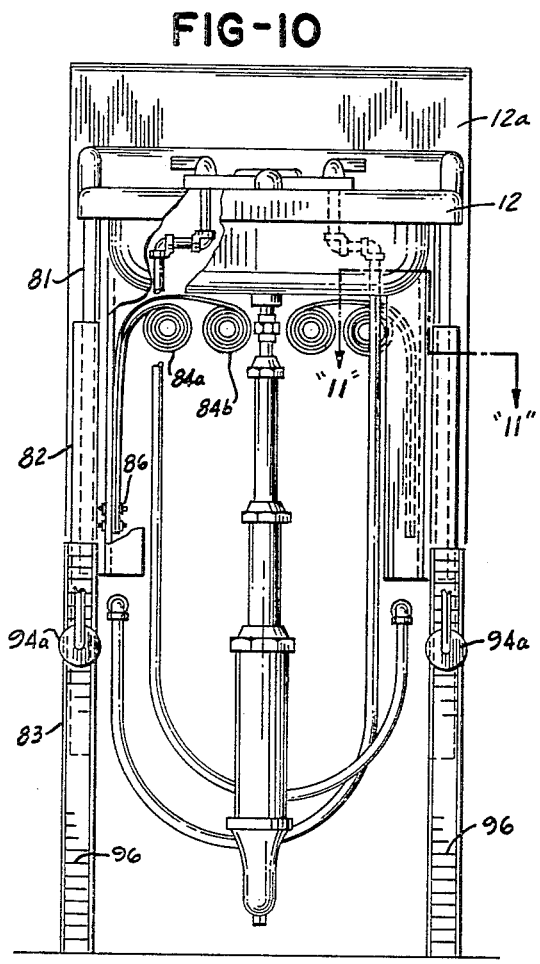
FIGURE 10 is a front elevational view, partly fragmentary, of the embodiment of FIGURE 9.
Figure 10A:
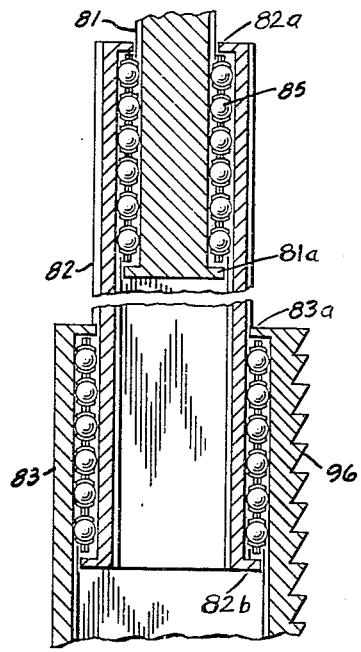
FIGURE 10A is a detail view, in section, taken along the lines 10A—10A of FIGURE 11.

A tension controlled embodiment is illustrated in FIGURES 9 through 11. It comprises a basin 12 with integral back plate 12a. The hot and cold water supply lines are arranged in the same manner as described in the previous embodiments. The telescoping drain assembly is also similar in configuration and operation to that previously described. For smoothly guiding vertical motions of basin assembly 12, 12a a telescoping track and slide assembly is employed. It includes a pair of slides 81 secured to back plate 12a and arranged vertically on each side of the basin. Slides 81 are each slidably disposed in a respective channel-shaped intermediate sliding track 82 which is slidably disposed in turn in an outer channel-shaped fixed track 83. Ball bearing assemblies 85 are provided between the slidable members 81, 82 and between 82 and fixed track 83.

The slides 81, 82 and track 83 are in telescoping arrangement and as shown are provided with suitable flange stops to control their inter-engagement and travel. There is accordingly a shoulder 81a on innermost slide 81 which, through the respective bearing assemblies, engages a lip 82a on middle slide 82 when the basin is elevated to a certain height. At this point, continued upward pressure causes slides 81 and 82 to remain in fixed position relative to each other, but to move together upwardly in track 83. A further flange 82b at the lower end of slide 82 engages a flange 83a at the upper end of track 83 through the respective bearing assemblies thereby limiting upward travel.

To promote a smooth and easily-controlled displacement of the basin assembly 12, 12a, a plurality of tensioning means are employed. These are embodied as two pairs of coil springs, each pair comprising a spring 84a and a spring 84b. These springs are of the type which provide a substantially uniform tension independent of their extension.

One end of each spring in each pair is connected to the basin assembly as by bolts 86 which secure the lower ends of springs 84a and 84b to the lower end of slide 81, the latter being secured to the basin assembly. The spring housings, including the upper ends of each spring band, are connected as shown in FIG. 11 to rear wall 80 or to any other convenient member of the fixed supporting structure, by connector 84c.

It has been found that the use of a pair of tensioning means connected to each side of the basin assembly provides smooth operation requiring little effort in raising and lowering the basin, the tension provided by the spring mechanisms serving to offset the weight of the basin assembly and its associated slide arms. To elevate the basin, a slight upward pressure is exerted, the spring forces tending to supplement this so that the basin is easily raised. For lowering the assembly, a slight downward pressure is applied with the weight of the basin tending to offset the upwardly exerted forces produced by the spring mechanisms.

For locking the embodiment of FIGURES 9, 10 and 11 at the desired elevation, a control mechanism may be employed as best illustrated in FIGURES 12 and 13. In the exemplary illustration, this mechanism takes the form of a control lever 90 having a control handle 91a at one end. A central section 91b of lever 90 is pivoted on a bracket assembly 92 and the latter is secured to the basin assembly by way of basin support bracket 99. Control 90 also includes actuating end 91c which engages a clamping lever 94.

Clamp lever 94 includes an upper section having a contoured surface 93 in engagement with end 91c of control lever 90. The clamping lever is pivoted to back plate 12a by way of bracket 95 and its lower end is provided with a clamping pad 94a having a rack type surface adapted for engagement with a similar surface formed or provided on fixed track 83. A spring 94b secured to back plate 12a engages clamping lever 94 and urges same in the direction which causes clamping pad 94a to engage and be locked to track 83 thereby locking the basin assembly.

The clamp is released for either upward or downward motion of the basin by elevating control handle 91a (for upward movement) and depressing same (for downward movement), whereupon the control arm 90 rocks clamping lever 94 out of engagement with track 83. When the proper basin height is attained, control 91a is released and clamping action restored with the aid of spring 94b.

Either a single control assembly or one operating on either side of the basin assembly may be employed. In the latter case, control arm 90 is connected to a corresponding assembly on the opposite side of the basin as by rod 91d, FIGURE 13A.

An arrangement is illustrated in FIGURES 14, 15 and 16 which is adapted to controllably adjust the height of a basin of the pedestal type. The faucet and associated plumbing have been omitted for clarity but may follow the same general organization as hereinbefore described. The drain may be of the telescoping type but is preferably of the type illustrated hereinafter in connection with the embodiment of FIGURES 17 and 18.

The arrangement of FIGURES 14–16 includes a telescoping assembly including an inner slide 102, the upper end of which is secured to basin 100 via bracket 100a, an intermediate slide 103, and a fixed outer post 104 having a base 109 which is supported on the floor. Intermediate slide 103 includes a rack 103a which is engaged by a pinion 107 driven by a reversible motor 105 by way of a gear reduction and clutch assembly 106. The clutch is designed to disconnect the motor from the basin assembly when the limits of upper and lower travel have been reached as defined by stops, not shown. The motor may be conveniently mounted as by a base plate 105a to the fixed section 104 of the telescoping assembly.

Rotatably mounted on intermediate slide 103 is a pinion 108 which engages a rack 102a on inner slide 102 and a rack 104a on the outer fixed member 104. When motor 105 is actuated to run in the desired direction, it displaces intermediate slide 103 causing gear 108 to travel along the fixed rack 104a. The resultant rotation of gear 108 causes in turn a displacement of innermost slide 102. Hence, a compound action is provided causing a compound displacement of the basin 100. This arrangement has the advantage of providing a wide range of displacements while at the same time providing a simple and sturdy basin support arrangement. Suitable switch and circuit means (not shown) are provided to control the actuation of the motor in the desired direction.

The embodiment illustrated in FIGURES 17, 18 and 18A employs the same plumbing arrangement and the same compounding technique as that just described. However, coil spring means 130 are employed to offset the weight of the basin and to permit its height adjustments in a smooth and simple manner.

The telescoping pedestal assembly in this embodiment includes an outer fixed support 125 to the cover 125a of which is secured the spring coils 130 at the inner ends thereof. The distal spring ends are each connected to a respective cable or strap coupling 130a which is entrained over respective idler 130b rotatably mounted on the fixed support assembly. The distal ends of the straps are secured in turn to the intermediate slide 124 at opposite sides thereof. As in the previous embodiment, the intermediate slide includes a gear 126 rotatably mounted thereon and oriented to engage a rack 125b on fixed support 125, and a rack 122a on the innermost telescoping section 122. The latter is fixed to the basin 120 by means of a bracket assembly 123 which has an opening for accommodating the drain connections 128a, 128b and 129. The latter may be a flexible hose connected at its lower end to a suitable trap or otherwise configured to accommodate local sanitary codes.

A control mechanism is illustrated in FIGURES 17, 18 and 18A. It includes a control lever 140 extending from a region adjacent the basin into the interior of the telescoping support and has a locking tooth 141 pivotally coupled to its distal end 140a. Tooth 141 extends from the interior of inner member 122 through a slot 122d into a region of engagement with a rack section 124d of intermediate slide 124. The tooth is pivotally mounted on a side wall of slot 122d, is biased into engagement with rack 124d by spring means 142, and is rocked vertically out of engagement by either up or down displacements of control arm 140 which is slidably mounted in slots in bracket 123 and telescoping member 122.

With control arm 140 in its intermediate position, the telescoping support 121 is locked. For upward movements, control arm 140 is conveniently displaced upwardly, disengaging inner slide 122 from intermediate slide 124 by virtue of the pivoting of tooth 142. Downward displacement is accomplished conveniently by a downward displacement of the control arm.

In operation, and with the locking mechanism released, pressure in the desired direction is applied to basin 120 whereupon member 122 with its rack 122a commences to move relative to intermediate member 124 causing rotation of gear 126. Rotation of the latter causes intermediate section 124 to move relative to fixed section 125. Hence, there is displacement of inner member 122 relative to intermediate member 124 and further displacement due to the motion of 124 relative to 125.

Referring now to the embodiment of FIGURES 19, 20 and 21, there is illustrated therein a basin assembly 150 which will normally include faucets, flexible water lines and drain connections, not shown, as described hereinbefore. The basin is mounted on a telescoping support which is hydraulically actuated. The support includes a fixed cylinder 152 having a base 153 mounted on the floor or supporting structure, a valve 154, and a piston 155.

Piston 155 supports a movable cylinder 156 which further includes a piston 157 having a rod 158 on which the basin assembly 150 is mounted with the aid of bracket 159. A passageway 156a in piston 155 connects the interior of cylinder 152 with that of cylinder 156.

Valve 154 of fixed cylinder 152 has hydraulic fluid inlet 160 and outlet 161. The inlet may be supplied from a suitable source, such as one of the water lines, with or without additional pressure regulation, while the outlet 161 is connected by means, not shown, to the drain system.

The valve includes a valve plate 154 having a control member 163 for rotating the valve plate. The control member is illustratively terminated by a foot pedal whereby the user may control the valve by displacing the control in a rotary manner between the "Up," "Hold" and "Down" positions.

The valve plate 154, which is shown in greater detail in FIGURE 20, has a passageway 162a therein which cooperates with a bore 152a in the cylinder wall and with the inlet and outlet passageways in the manner described in connection with the embodiment of FIGURES 5 and 6.

In operation, elevation of the basin is accomplished by operating control 163 to the "Up" position. In this state, inlet 160 communicates with the interior of cylinder 152 by way of passageway 162a and cylinder wall bore 152a. Fluid under pressure is thus directed into the interior of cylinder 152 and then flows through bore 156a in piston 155 to the interior of movable cylinder 156. The pressurized fluid in the latter causes piston 157 to rise thereby initiating elevation of the basin. When maximum displacement of piston 157 is attained and provided the control is maintained in the "Up" position, the hydraulic pressure acts on piston 155 causing it to rise and thereby providing further elevation of the basin. Moving the control 163 to the intermediate or "Hold" position terminates the action at the attained height. Moving the control 163 to the "Down" position connects the stored hydraulic fluid to the drain system by way of outlet 161 thus causing the basin to descend gravitationally until the control is returned to the "Hold" position.

In the study and practice of the invention, modifications will undoubtedly occur to those skilled in the art. The invention is thus not limited to the specific mechanisms shown and described. For example, means other than flexible lines and telescoping connections may be employed in the plumbing system to accommodate motion. Some changes may also be dictated by local sanitary codes. Over-center locking which uses the couple acting on the support may be employed where convenient. Also, the illustrated configuration may be modified for lateral mobility if desired. Furthermore, the actuator mechanism may be located in a relatively remote position with a suitable transmission system linking same with the basin. In view of the adjustability of the basins, they may of course be used for purposes other than washing where desired.

What is claimed is:

1. Vertically adjustable lavatory mechanism hydraulically elevated and gravitationally lowered comprising a basin having a drain, water supply means connected to a fixed source of water and to said basin and having a movable section for accommodating vertical movement of said basin, a fixed waste line having a trap, an extensible and retractable discharge line connecting said trap to said basin drain, track means, guide means connected to said basin and movable vertically in said track means, a linear hydraulic actuator located below said basin adjacent said discharge line and track, said actuator having a cylinder, a piston and a piston rod, said piston rod being disposed parallel to said waste line and being connected to the bottom of said basin adjacent said drain, a three-way valve in the base of said actuator, a discharge port in said actuator communicating with said valve and connected directly to said trap, an inlet port connected to said valve supplied with water under pressure from said source, said valve supplying water under pressure to said cylinder in one position for hydraulically raising said basin, sealing said cylinder in another position for locking said basin, and connecting said cylinder to said trap in a third position whereupon said basin is lowered under the action of gravity.

2. Lavatory mechanism as defined in claim 1 including a control lever connected at the base of said actuator to said valve and extending outwardly from said actuator to a point of access.

3. Lavatory mechanism as defined in claim 1 in which said track means comprise a pair of channel-shaped rails disposed behind said basin and in which said guide means comprises a pair of rollers disposed in rolling engagement with said track means.

4. Counter-balanced, vertically adjustable lavatory mechanism comprising a basin having a drain, water supply means connected to a fixed source of water and to said basin and having a movable section for accommodating vertical movement of said basin, waste line means connected to a waste line and to said basin drain and having a retractable and expansible section for accommodating vertical movement of said basin, track means comprising a pair of parallel upstanding channel members located and oriented for positioning within a recess behind said basin, guide means comprising roller means connected to the rear of said basin and disposed in said channel members, a counter-weight disposed behind said basin between said channel members, and pulley means connecting each side of said counter-weight means to the respective side of said basin at the rear thereof.

5. Lavatory mechanism as defined in claim 4 including clamp means comprising a spring loaded brake slidably connected to the rear part of said basin and having a braking member in engagement with a flange of one of said channel members, said clamp means having a control knob connected to said brake member for disengaging said brake member against the action of said spring from said channel member.

6. Lavatory mechanism as defined in claim 4 including panel means positioned at the rear of said basin in an orientation which covers said recess, said panel means including slots for accommodating the motion of said basin.

7. Lavatory mechanism as defined in claim 4 including a locking assembly selectively interconnecting said basin and said track means.

8. Spring-assisted vertically adjustable lavatory mechanism comprising a basin having a drain, water supply means connected to a fixed source of water and to said basin and having a movable section for accommodating vertical movement of said basin relative to said source, a waste line connected to said basin drain and having a movable section for accommodating movement of said basin, a pedestal assembly for supporting said basin, said pedestal assembly having one section connected to said basin and another fixed section, said two sections being in telescoping relationship, spring means for offsetting the weight of said basin, said spring means being located adjacent the base of said fixed section, the movable end of said spring means being routed up and over the upper periphery of said fixed section and into said fixed section to a point adjacent the periphery of said movable section at which point said spring means are connected to said movable section whereupon the weight of said basin tending to lower said movable section is resisted by the tension provided by said spring means.

9. A lavatory mechanism as defined in claim 8 in which said spring means comprise a pair of coil springs having a substantially constant tension when said springs are unwound.

10. Lavatory mechanism as defined in claim 8 in which said pedestal includes bearing means and in which said spring means include a flexible longitudinal member trained over said bearing means and connected to said movable section at the base thereof.

11. Lavatory mechanism as defined in claim 8 in which said spring means comprise a pair of constant tension coil springs disposed on opposite sides of said fixed section and connected to respective sides of said movable section within said fixed section.

12. Lavatory mechanism as defined in claim 8 including a locking mechanism connected between said basin and said fixed section, said locking mechanism comprising a braking member, means urging said member into a position to lock said basin against vertical movement, a control linkage, and a control lever, said linkage interconnecting said lever to said brake member and configured to move said brake member out of said lock position when said control lever is moved to the up and down positions.

13. Lavatory mechanism as defined in claim 8 in which there is included an intermediate section of said telescoping assembly, said intermediate section having mounted thereon rotatable transmission mechanism in concurrent engagement with said fixed section and said basin-connected section whereupon a force applied to said basin causes movement of said base section relative to said intermediate section and movement of said intermediate section relative to said fixed section.

14. Vertically adjustable lavatory mechanism comprising a basin having a drain, water supply means connected to a source of water and to said basin and having a movable section for accommodating vertical movement of said basin, a waste line having a movable section for accommodating said vertical motion of said basin, said waste line interconnecting said basin drain to a waste disposal line, and a locking mechanism for said lavatory mechanism comprising a brake member, spring means urging said brake member into a brake position which locks said basin against vertical travel, and a control linkage having a control lever which is vertically displaceable for actuating said linkage to move said braking member out of said brake position when said control lever is moved to either the up or down position.

15. Lavatory mechanism as defined in claim 14 including vertically oriented track means fixed to a supporting structure, guide means connected to said basin and in movable engagement with said track means, said track means having a section adapted to be engaged by said brake member and said linkage being pivotally connected to said basin.

16. Vertically adjustable lavatory mechanism comprising a basin, water supply means connecting said basin to a source of water supply and having a movable section for permitting said vertical adjustment of said basin, discharge line means connecting said basin to a waste line and having a movable section for permitting said vertical adjustment of said basin, movable guide means comprising at least three relatively movable members in telescoping relationship, including one connected to said basin, another connected to a fixed support, and an intermediate section movably coupled to said basin section and support section.

17. Lavatory mechanism as defined in claim 16 in which said movable guide means comprise two sets of said telescoping members, the sets being vertically disposed in spaced parallel relationship.

18. Lavatory mechanism as defined in claim 16 in which said movable guide means are configured to form a pedestal support for said basin.

19. Lavatory mechanism as defined in claim 16 in which said support and intermediate sections each comprise a channel shaped track, the latter being nested in the former, in which said basin section is nested in said intermediate section, and including bearing means disposed between each section and the adjacent one.

20. Lavatory mechanism as defined in claim 16 including tensioning means connecting said basin section to said support section for offsetting the weight of said basin.

21. Lavatory mechanism as defined in claim 16 including locking means interconnecting said basin and support sections, said locking means including a spring loaded member urged into engagement with said support section, a control lever operative up and down relative to a neutral position, and lock control means coupling said member and lever and configured to disengage said member from said support section when said control lever is displaced out of said neutral position.

22. Vertically adjustable lavatory mechanism comprising a basin, water supply means connecting said basin to a source of water, discharge line means connecting said basin to a waste line, said water supply means and discharge line means being movable to accommodate vertical motion of said basin, and actuator means for displacing said basin, said actuator means comprising a first cylinder, a first piston in said cylinder, a second cylinder operatively connected to said first piston, a second piston in said second cylinder, said second piston being connected to said basin, a fluid path interconnecting said first and second cylinders, valve means for supplying fluid under pressure to said cylinders, whereby the application of fluid under presssure controlled by said valve causes a cumulative displacement of said basin by said second piston and by said first piston.

23. Lavatory mechanism as defined in claim 22 in which said fluid path includes a passageway in said first piston.

24. Lavatory mechanism as defined in claim 22 in which said first and second cylinders and their respective pistons are disposed in vertical alignment.

25. Lavatory mechanism as defined in claim 22 including a fluid connection from said first cylinder to said discharge line and in which said valve includes means for controlling said discharge line to permit lowering of said basin.

26. Lavatory mechanism as defined in claim 22 in which said first and second cylinders and their respective pistons are disposed and configured to form a vertically adjustable pedestal support for said basin.

27. Lavatory mechanism as defined in claim 22 in which said first and second cylinders are in telescoping relationship.

28. Adjustable lavatory mechanism comprising a basin, water supply means connected to said basin, drain line means connected to said basin, and an adjustable support for said basin comprising a first section coupled to the basin, a relatively fixed section connected to a supporting structure, and an intermediate section movable relative to said first and support sections for providing support therebetween and having transmission means coupled to said first section and driven thereby and coupled to said support section for causing displacement of said intermediate section relative to said support section when said first section is displaced.

29. Adjustable lavatory mechanism as defined in claim 28 in which said coupling means of said intermediate section comprise rotatable means rotatably mounted on said intermediate section and in engagement with said first and support sections.

30. Adjustable lavatory mechanism as defined in claim 28 in which said first, intermediate and support sections are in telescoping relationship.

31. Adjustable lavatory mechanism as defined in claim 28 in which said coupling means of said intermediate section comprise pinion means rotatably mounted on said intermediate section, and said first and support sections have rack means engaged by said pinion means.

32. Adjustable lavatory mechanism as defined in claim 28 in which said first, intermediate and support sections comprise members forming a telescoping basin support.

33. Adjustable lavatory mechanism as defined in claim 28 in which said intermediate and support sections comprise nested tubes.

34. Adjustable lavatory mechanism as defined in claim 28 including locking means interconnecting said first and intermediate sections, and control means for operating said locking means.

35. Adjustable lavatory mechanism as defined in claim 28 including spring means interconnecting at least two of said sections for applying a tension therebetween to offset the weight of said basin.

36. Adjustable lavatory mechanism as defined in claim 28 including motive means having a driven output member connected to said first section for driving same.

37. Adjustable lavatory mechanism comprising a basin having water supply and drain lines configured to permit vertical motion of said basin and adjustable support means comprising interconnected fixed and movable hydraulic actuators, said fixed and movable hydraulic actuators each including cylinder means and piston means and said movable actuator being mounted for displacement by said fixed actuator whereby said basin is displaced in accordance with the net displacements provided by both of said actuators.

References Cited

UNITED STATES PATENTS

| | | | |
|---|---|---|---|
| 2,065,952 | 12/1936 | Trautmann | 4—170 X |
| 2,958,871 | 11/1960 | Eskenazi et al. | 4—170 |
| 3,011,177 | 12/1961 | Haughey | 4—170 |
| 3,118,147 | 1/1964 | Larkin | 4—170 |

FOREIGN PATENTS

| | | |
|---|---|---|
| 132,764 | 8/1951 | Sweden. |

PATRICK D. LAWSON, Primary Examiner